United States
Paukert et al.

[11] 3,864,028
[45] Feb. 4, 1975

[54] THREE COMPONENT REPRODUCTION OBJECTIVE

[75] Inventors: Miloslav Paukert, Prerov; Libuse Schwarzova, Pencicky, both of Czechoslovakia

[73] Assignee: Meopta, narodni Podnik, Prerov, Czechoslovakia

[22] Filed: June 7, 1973

[21] Appl. No.: 367,822

[30] Foreign Application Priority Data
June 13, 1972 Czechoslovakia .................. 4092-72

[52] U.S. Cl. ................................................ 350/227
[51] Int. Cl. ............................................ G02b 9/20
[58] Field of Search ........................... 350/226, 227

[56] References Cited
UNITED STATES PATENTS
2,346,086   4/1944   Schade et al. ...................... 350/227

FOREIGN PATENTS OR APPLICATIONS
1,088,248   9/1960   Germany ............................ 350/227

*Primary Examiner*—John K. Corbin

[57] ABSTRACT

A lens system for reproduction comprising three axial components. The first component nearest the image-plane side is a simple biconvex element, the second component being in the middle is a simple biconcave element, and the third component nearest the objective-plane side is a cemented concave-convex lens composed from a biconcave element and a biconvex element. The system complies with the following conditions:

$(f_A + f_C) > F > (|f_B| + f_C)$
$|f_{C_1}| > |f_B| > f_{C_2}$
$r_2 > r_5 > r_3$
$r_7 > r_6 > r_1$
$(m_1 + m_2) > (d_3 + d_4) > (d_1 + d_2)$
$n_d^4 > n_d^1 > n_d^2$ where $f_A$ is the focal length of the first component
$f_B$ is the focal length of the second component
$f_{C_1}$ is the focal length of the biconcave element of the third component
$f_{C_2}$ is the focal length of the biconvex element of the third component
$f_C$ is the focal length of the entire third component
$F$ is the focal length of the entire reproduction objective
$r_1 - r_7$ are the radii of curvature of the individual refracting surfaces
$m_1$ and $m_2$ are the airspaces between the individual optical components
$d_1 - d_4$ are the axial thicknesses of the individual elements
$n_d^1$, $n_d^2$ and $n_d^4$ are the refracting indices of glass for the spectral D-line of the appropriate elements, all taken from the direction of the image plane.

2 Claims, 1 Drawing Figure

PATENTED FEB 4 1975          3,864,028
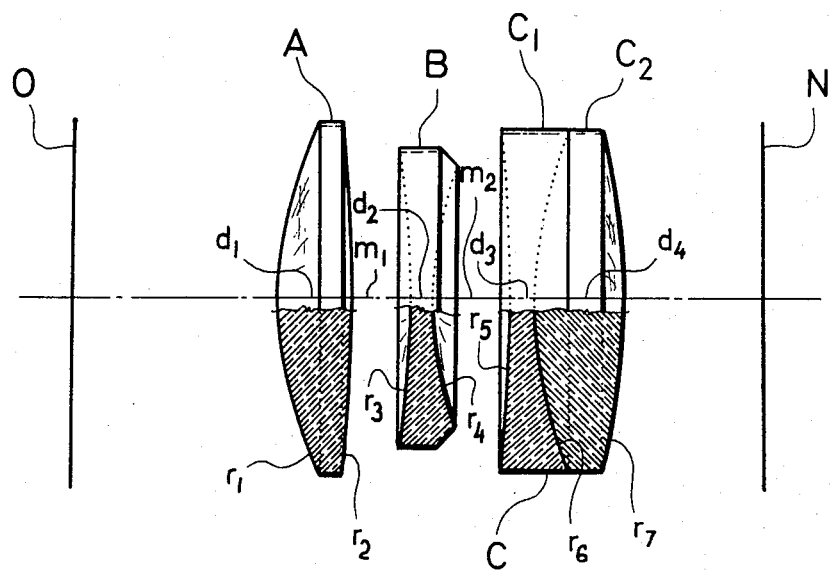

3,864,028

THREE COMPONENT REPRODUCTION OBJECTIVE

RELATED APPLICATION

The present application is a companion to Ser. No. 367,848, filed on even date herewith corresponding to Czechoslovak Application PV 3961-72, dated June 8, 1972. Reference and incorporation of that disclosure herein may be made as if more fully set forth herein.

BACKGROUND OF INVENTION

The present invention relates to optical lens systems and particularly to an objective for reproduction and purposes of negative enlargement.

The known optical systems for reproduction objectives are generally of simple construction, and are suitable for enlargement only within a small range. The basic aperture employed with these systems is as a rule, about f/4.5 and have an angular field of approximately 46° and a geometric vignetting, about the edges of the projected image, of about 50°. This is quite sufficient for ordinary purposes. But, this condition is satisfactory in proucing quality images in only a predefined magnification range. If this range is exceeded a severe falling-off in image quality results. This drop in quality can only be corrected by stopping-down the objective at a great loss of reproduction light. An improvement seeking to compensate for the loss in image quality requires the use of a number of additional optical components as well as the use of special optical glass. These improvements increase the cost of production, the complexity of the objective and the ultimate price to the consumer.

It is the object of the present invention to provide an optical lens system for a reproduction objective which overcomes the disadvantages of the prior art.

It is an object of this invention to provide a lens system of the type disclosed which produces enlargement of good image quality over a wide magnification range, as for example from 2 × to 10 ×.

It is a further object of the present invention to provide a lens system which produces good image quality over the wide magnification range without the need to stop-down or reduce the aperture or without any increase in vignetting about the edges of the projected image.

It is a further object of the present invention to provide a lens system constructed from a minimum number of components employing ordinary optical glass.

These objects and other advantages of the present invention will be seen from the following disclosure of the present invention.

SUMMARY OF THE INVENTION

According to the present invention an objective for reproduction purposes is formed of three components, axially arranged in such a manner that the first component nearest the image-plane side is a simple biconvex element, the third component nearest the negative or object plane side is a cemented concave-convex lens composed of a biconcave element and a biconvex element, and the second or middle component is a simple biconcave element.

In this arrangement the focal length of the reproduction objective as a whole is greater than the sum of an absolute value of the focal length of the second component and of the focal length of the third component, however it is less than the sum of the focal lengths of the first and third components. The absolute value of the focal length of the second component is greater than the focal length of the biconvex element of the third component, however, it is less than the absolute value of the focal length of the biconcave element of the third component. The radius of curvature of the fifth refracting surface is greater than the radius of curvature of the third refracting surface, however it is less than the radius of curvature of the second refracting surface, and the radius of curvature of the sixth refracting surface is greater than the radius of curvature of the first refracting surface, however, it is less than the radius of curvature of the seventh refracting surface. The sum of the axial thicknesses of the elements of the third component is greater than the sum of axial thicknesses of separate first and second components, however, it is less than the sum of airspaces between the individual components. The refractive index for the spectral D-line of the first component is greater than the refractive index for the spectral D-line of the second component, however, it is less than the refractive index for the spectral D-line of the biconcave element of the third component.

Full details of the present invention are given in the following description and are illustrated in the accompanying drawings.

BRIEF DESCRIPTION OF THE DRAWING

The FIGURE of the drawing is a schematic sectional view along the optical axis of the lens system of the present invention.

DESCRIPTION OF INVENTION

As seen in the drawing, the lens system of the present invention comprises three components A, B and C from which the first component A is a simple biconvex element whose smaller radius of curvature is placed on the side nearest to the image plane 0. The second or middle component B is formed by a simple biconcave element and the third component C is a cemented concave-convex lens, composed from two elements from which the first element $C_1$, placed at a greater distance from the negative plane N, is of biconcave type while the second element $C_2$, cemented to it, is of the biconvex type. The individual radii of curvature of refracting surfaces taken from the direction of the image plane are labelled $r_1 - r_7$, the axial thicknesses of individual lenses are labelled $d_1 - d_4$ and the airspaces between the individual components are labelled $m_1$ and $m_2$.

The lenses are arrnaged concentrically along the common optical axis and may be housed in a suitable tube or box like housing.

In accordance with the present invention, the lens components have the following relationship:

$(f_A + f_C) > F > (|f_B| + f_C)$
$|f_{C_1}| > |f_B| > f_{C_2}$
$r_2 > r_5 > r_3$
$r_7 > r_6 > r_1$
$(m_1 + m_2) > (d_3 + d_4) > (d_1 + d_2)$
$n_d4 > n_d1 > n_d2$ where $f_A$ is the focal length of the first component
$f_B$ is the focal length of the second component
$f_{C_1}$ is the focal length of the biconcave element of the third component $f_{c_2}$ is the focal length of the biconvex element of the third componennt $f_c$ is the focal length of the entire third component $F$ is the focal length of the entire reproduction objective $r_1 - r_7$ are the radii of curvature of the individual refracting surfaces $m_1$ and $m_2$ are the airspaces between the individual optical components $d_1 - d_4$ are the axial thicknesses of the individual elements.

$n_d1$, $n_d2$ and $n_d4$ are the refracting indices of glass for the spectral D-line of the appropriate elements, all taken from the direction of the image plane.

As a result of establishing this above relationship, the objects ennumerated earlier are obtained. That is a simple objective made of a minimum number of components is provided with which magnification, at least in the 2 × to 10 × range can be obtained. Further, the lens system will result in little if any distortion or vignetting and may be used with wide apertures.

In the following table the parameters of an exemplary embodiment of a reproduction objective are given for an aperture f/4.5 and focal length $F=100$ mm by which the objective is suitable for 2 - 10× magnification range regarding to its state of correction.

| | | $n_d$ | $\nu$ |
|---|---|---|---|
| $r_1 = +\ 27.36$ | | | |
| | $d_1 = 4.55$ | 1.62041 | 60.3 |
| $r_2 = -1978.05$ | | | |
| | $m_1 = 4.36$ | air | |
| $r_3 = -\ 62.69$ | | | |
| | $d_2 = 1.65$ | 1.59551 | 39.2 |
| $r_4 = +\ 25.3$ | | | |
| | $m_2 = 5.23$ | air | |
| $r_5 = -\ 142.92$ | | | |
| | $d_3 = 1.74$ | 1.53172 | 48.9 |
| $r_6 = +\ 28.52$ | | | |
| | $d_4 = 6.59$ | 1.65844 | 50.8 |
| $r_7 = -\ 41.81$ | | | |

In this example, $n_d$ is the refractive index of an optical glass for the D-line of the spectrum and $\nu$ is the Abbe number. The parameters are measured in mm.

The optical lens system according to the invention is particularly suitable for enlarging purposes. The objective calculated in correspondence to the above for the focal length $F=50$ mm reproduces a 24 × 36 mm negative in the entire 2-10× magnification range with good quality.

It will be obvious that the present disclosure is illustrative only of the various embodiments possible. It is therefore intended that it should not be limiting of the scope of the invention except as defined in the appended claims.

What is claimed is:

1. A lens system for reproduction comprising three components axially arranged in such a manner that the first component nearest the image-plane side is a simple biconvex element, the second component being in the middle is a simple biconcave element, and the third component nearest the objective-plane side is a cemented concave-convex lens composed from a biconcave element and a biconvex element, said system complying with the following conditions:

| | | $n_d$ | $\nu$ |
|---|---|---|---|
| $r_1 = +\ 27.36$ | | | |
| | $d_1 = 4.55$ | 1.62041 | 60.3 |
| $r_2 = -1978.05$ | | | |
| | $m_1 = 4.36$ | air | |
| $r_3 = -\ 62.69$ | | | |
| | $d_2 = 1.65$ | 1.59551 | 39.2 |
| $r_4 = +\ 25.3$ | | | |
| | $m_2 = 5.23$ | air | |
| $r_5 = -\ 142.92$ | | | |
| | $d_3 = 1.74$ | 1.53172 | 48.9 |
| $r_6 = +\ 28.52$ | | | |
| | $d_4 = 6.59$ | 1.65844 | 50.8 |
| $r_7 = -\ 41.81$ | | | | where $r_1 - r_7$ are the radii of curvature of the individual refracting surfaces $d_1 - d_4$ are the axial thicknesses of the individual components and elements thereof $m_1$ and $m_2$ are the airspaces between the individual components $n_d$ is the refracting index for the spectral D-line and $\nu$ is the Abbe number.

2. The lens system according to claim 1 wherein the focal length F is 100 mm.

* * * * *